(12) United States Patent
Turner et al.

(10) Patent No.: US 11,607,036 B2
(45) Date of Patent: Mar. 21, 2023

(54) FOOD SERVICE APPARATUS WITH PELTIER HEATING AND COOLING SYSTEMS

(71) Applicant: Bi-Polar Holding Company LLC, Salt Lake City, UT (US)

(72) Inventors: Jeffrey Turner, Salt Lake City, UT (US); Tyler Lyon, Bluffdale, UT (US)

(73) Assignee: BI-POLAR HOLDING COMPANY LLC, Salt Lake City, UT (US)

(*) Notice: Subject to any disclaimer, the term of this patent is extended or adjusted under 35 U.S.C. 154(b) by 283 days.

(21) Appl. No.: 15/647,779

(22) Filed: Jul. 12, 2017

(65) Prior Publication Data

US 2018/0014635 A1 Jan. 18, 2018

Related U.S. Application Data

(60) Provisional application No. 62/361,206, filed on Jul. 12, 2016.

(51) Int. Cl.
*A47B 31/02* (2006.01)
*A47J 39/02* (2006.01)
*A47B 31/00* (2006.01)

(52) U.S. Cl.
CPC .......... *A47B 31/02* (2013.01); *A47J 39/02* (2013.01); *A47B 2031/003* (2013.01); *A47B 2031/026* (2013.01)

(58) Field of Classification Search
CPC .......... F25B 21/02; A47B 2031/023; A47B 2031/026; A47B 31/02; F28D 9/0068; F28D 3/04; A47J 27/10; A47J 39/00

(Continued)

(56) References Cited

U.S. PATENT DOCUMENTS 3,138,934 A 6/1964 Roane
3,214,922 A 11/1965 Koblischek
(Continued)

FOREIGN PATENT DOCUMENTS

DE 102011010395 A1 8/2012
DE 102012003237 A1 4/2013
JP 2000065440 A * 3/2000

OTHER PUBLICATIONS

Nasiruddin, Heat transfer augmentation in a heat exchanger tube using a baffle. Apr. 2007, Elsevier, vol. 28, issue 2, pp. 318-328 (Year: 2007).*

Primary Examiner — Ibrahime A Abraham
Assistant Examiner — Spencer H. Kirkwood
(74) Attorney, Agent, or Firm — Bretton L. Crockett; TechLaw Ventures, PLLC

(57) ABSTRACT

Systems and apparatus for heating or cooling food. A heating and cooling system for operative connection to a well includes a first manifold having a plurality of openings, each allowing a seal to be made against a first surface of a Peltier chip, and defines a flow path for a heat transfer fluid which directly contacts the first surfaces of a plurality of Peltier chips. The fluid circulates through tubing from the manifold to the well and connects to a flow space of a tray disposed therein. A second opposite manifold may be joined to the first manifold to form a block and defines a second flow path allowing direct contact with the second surfaces of the plurality of Peltier chips. The fluid circulates through tubing from the second manifold to a radiator. The manifolds may be joined to form a manifold block. The trays may be interchangeable.

16 Claims, 12 Drawing Sheets

(58) Field of Classification Search
USPC .......................................................... 392/488
See application file for complete search history.

(56) References Cited

U.S. PATENT DOCUMENTS

| | | | |
|---|---|---|---|
| 3,314,242 A | 4/1967 | Lefferts | |
| 3,324,667 A | 6/1967 | Muller | |
| 3,842,535 A * | 10/1974 | Lahr | A01G 31/02 47/62 R |
| 5,086,693 A | 2/1992 | Tippmann et al. | |
| 5,154,661 A | 10/1992 | Higgins | |
| 5,201,364 A | 4/1993 | Tippmann et al. | |
| 5,282,367 A | 2/1994 | Moore et al. | |
| 5,363,672 A | 11/1994 | Moore et al. | |
| 5,404,935 A * | 4/1995 | Liebermann | A21B 1/10 165/48.1 |
| 5,461,878 A | 10/1995 | Moore et al. | |
| 5,544,487 A | 8/1996 | Attey et al. | |
| 5,564,276 A * | 10/1996 | Abadilla | F25B 21/04 136/204 |
| 5,588,300 A | 12/1996 | Larsson et al. | |
| 5,628,769 A | 5/1997 | Saringer | |
| 5,653,111 A * | 8/1997 | Attey | F04D 13/0673 165/170 |
| 5,711,155 A | 1/1998 | DeVilbiss et al. | |
| 5,718,124 A | 2/1998 | Senecal | |
| 5,771,788 A | 6/1998 | Lee et al. | |
| 5,782,094 A | 7/1998 | Freeman | |
| 5,871,526 A | 2/1999 | Gibbs et al. | |
| 5,895,418 A | 4/1999 | Saringer | |
| 5,921,096 A * | 7/1999 | Warren | F25D 15/00 62/185 |
| 5,941,077 A | 8/1999 | Safyan | |
| 5,970,719 A | 10/1999 | Merritt | |
| 6,344,630 B1 | 2/2002 | Jarvis et al. | |
| 6,409,186 B2 | 6/2002 | Bennington | |
| 6,467,294 B1 * | 10/2002 | Walker | A47F 3/0447 62/255 |
| 6,502,405 B1 | 1/2003 | Van Winkle | |
| 6,658,858 B1 | 12/2003 | Thompson et al. | |
| 6,735,958 B2 | 5/2004 | Baumann | |
| 7,069,732 B2 | 7/2006 | Walker et al. | |
| 7,665,311 B2 | 2/2010 | Steffensen et al. | |
| 7,748,228 B2 | 7/2010 | Walker et al. | |
| 8,850,829 B2 | 10/2014 | Brija | |
| 8,952,556 B2 | 2/2015 | Warren | |
| 2001/0004863 A1 | 6/2001 | Simeray et al. | |
| 2002/0139123 A1 | 10/2002 | Belle | |
| 2004/0006997 A1 | 1/2004 | Clark et al. | |
| 2004/0025516 A1 | 2/2004 | Van Winkle | |
| 2004/0068991 A1 | 4/2004 | Banney | |
| 2005/0005612 A1 | 1/2005 | Kennedy | |
| 2006/0277924 A1 | 12/2006 | Platkin | |
| 2008/0016881 A1 | 1/2008 | Steffensen et al. | |
| 2008/0142068 A1 * | 6/2008 | Bean | F25B 21/02 136/201 |
| 2008/0156476 A1 | 7/2008 | Smisson et al. | |
| 2008/0283042 A1 | 11/2008 | Tippmann, Jr. et al. | |
| 2010/0158660 A1 * | 6/2010 | Radhakrishnan | F25D 31/005 414/800 |
| 2011/0146301 A1 | 6/2011 | Chapman et al. | |
| 2013/0174577 A1 | 7/2013 | Brija et al. | |
| 2014/0251164 A1 * | 9/2014 | Alipour | A47J 27/10 99/483 |
| 2014/0272063 A1 | 9/2014 | Tippman et al. | |
| 2014/0366559 A1 | 12/2014 | Brija et al. | |
| 2015/0201749 A1 | 7/2015 | Turner et al. | |

* cited by examiner

FOOD SERVICE APPARATUS WITH PELTIER HEATING AND COOLING SYSTEMS

CROSS-REFERENCE TO RELATED APPLICATION

This application claims the benefit of U.S. Provisional Application No. 62/361,206, filed Jul. 12, 2016, the disclosure of which is incorporated herein by reference in its entirety.

TECHNICAL FIELD

The present invention relates generally to the service of food at a desired temperature and, more particularly, to systems and apparatus for heating and cooling food for preparation and serving.

BACKGROUND

Perishable foods for home, market, catering and restaurant buffets are conventionally chilled by ice or commercially manufactured containers of freezable material, or by refrigeration systems. When the ice melts and the freezable material warms, these cooling media lose their ability to keep foods safe and may render them unsuitable or hazardous for consumption. Typical refrigeration systems are bulky and costly, requiring condensers, coils and harmful chemicals and, further, must be serviced and maintained. Additionally, they are not easily adapted for portability.

Other foods need to be heated or kept warm for home, market, catering and restaurant buffet service. Conventional sources of heat include flame and electricity, e.g. by use of alcohol-based combustible gels, such as those offered under the tradename STERNO, or by electric hot plates. Flame sources often produce local hot spots and uneven heating and may produce fumes, odors, or other combustion products. The indoor pollution and health risks to food service workers and patrons from these combustion products are beginning to be viewed with concern by those in the industry.

U.S. Pat. Nos. 8,307,761 and 8,661,970 to Shackleford et al. discloses a food counter apparatus, which uses pans or trays placed into wells that can be heated by electrical resistance heaters or cooled by refrigerated circulated through tubing from a condenser. Such systems may have issues with efficiency and require long times to reach a desired temperature. Consequently, a system or method that allows for a transport cabinet to both heat and cool food which is efficient and capable of reaching a desired temperature in a short amount of time would be an improvement in the art. Such a system that was able to combine the cooling and heating functions into a single system rather than requiring multiple systems in a single apparatus would be an additional improvement in the art.

SUMMARY

The present invention provides systems and apparatus for heating or cooling food to an appropriate temperature for service in pans or trays held in wells in a countertop apparatus. A table includes heating/cooling system for operative connection to one or more wells. The heating/cooling system comprises at least one manifold having a plurality of openings, each allowing a seal to be made against a first surface of a Peltier chip defines a flow path for a heat transfer fluid which directly contacts the first surfaces of a plurality of Peltier chips. The fluid then circulates through tubing from the manifold to the wells. A second opposite manifold also has a plurality of openings, each allowing a seal to be made against a second surface of a Peltier chip to define a flow path for a heat transfer fluid which directly contacts the second surfaces of the plurality of Peltier chips. The fluid then circulates through tubing from the manifold to a separate radiator. The manifolds may be joined to form a block enclosing the chips. One or more fans may be placed to encourage airflow through the radiators and coolant reservoirs and pumps may be included, as needed. Application of current in a first direction to the Peltier chips can heat the wells and reversal of the current may be used to cool the wells, with each wellbeing independently controllable. In some embodiments, the wells may be interchangeable and reconfigurable.

DESCRIPTION OF THE DRAWINGS

It will be appreciated by those of ordinary skill in the art that the various drawings are for illustrative purposes only. The nature of the present disclosure invention, as well as other varying embodiments, may be more clearly understood by reference to the following detailed description, the attached appendix, and to the drawings.

DETAILED DESCRIPTION

The present disclosure relates to systems, methods and apparatus for heating or cooling food to, or maintaining food at, an appropriate temperature for preparation or service in a standard food preparation or service tray, such as a chafing dish or wells in a food preparation counter. It will be appreciated by those skilled in the art that the embodiments herein described, while illustrating certain embodiments, are not intended to limit the disclosure. Those skilled in the art will also understand that various combinations or modifications of the embodiments presented herein can be made without departing from the scope of this disclosure and that all such alternate embodiments are within the scope of this description. Similarly, while the drawings depict illustrative embodiments of the devices and components illustrate the principles upon which those devices and components are based, they are only illustrative, and any modifications of the features presented here are to be considered within the scope of this disclosure.

Figure 1:
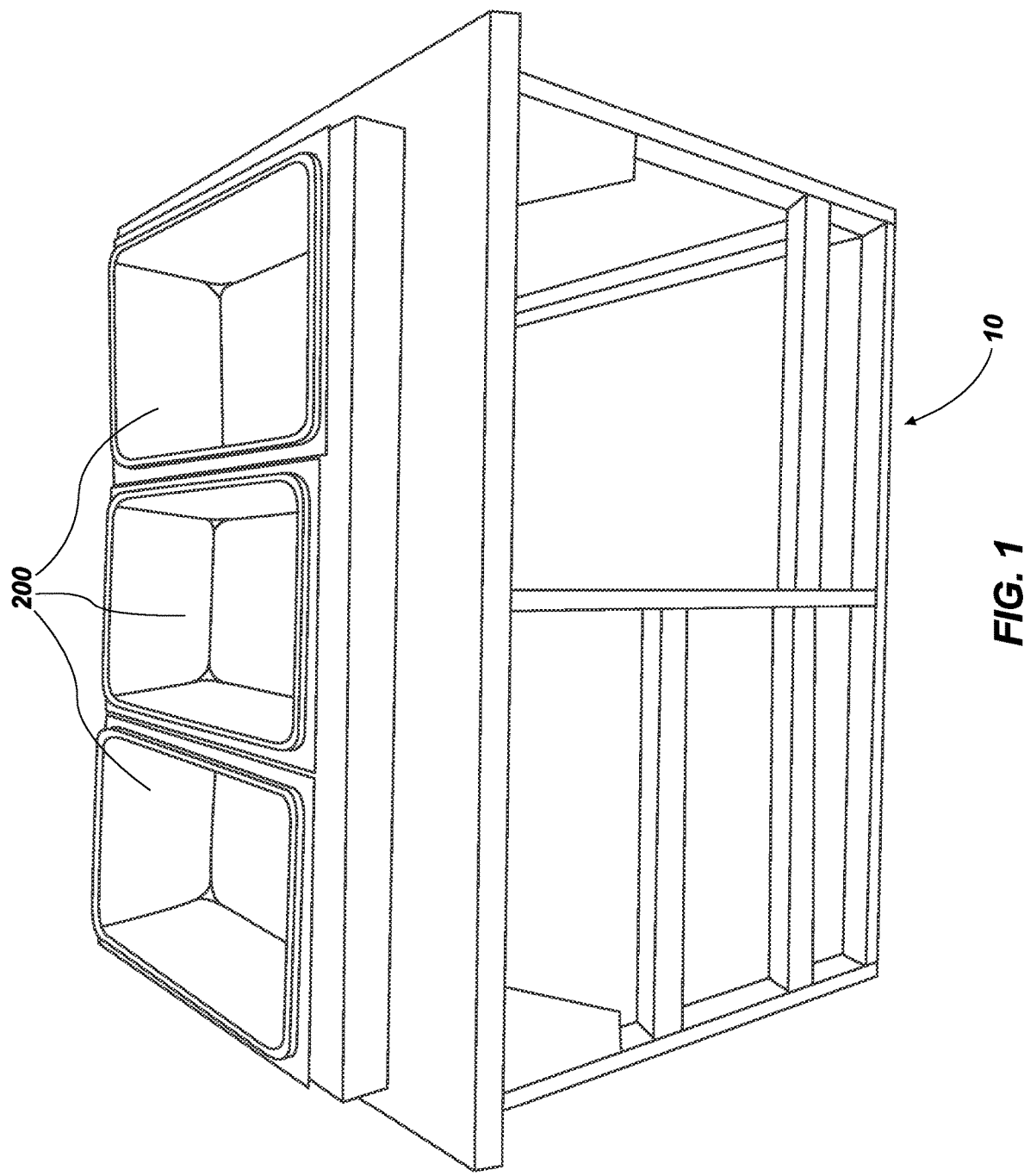
FIG. 1 is a rear view of a first embodiment of a countertop apparatus for foodservice use in accordance with the present disclosure.
Figure 2A:
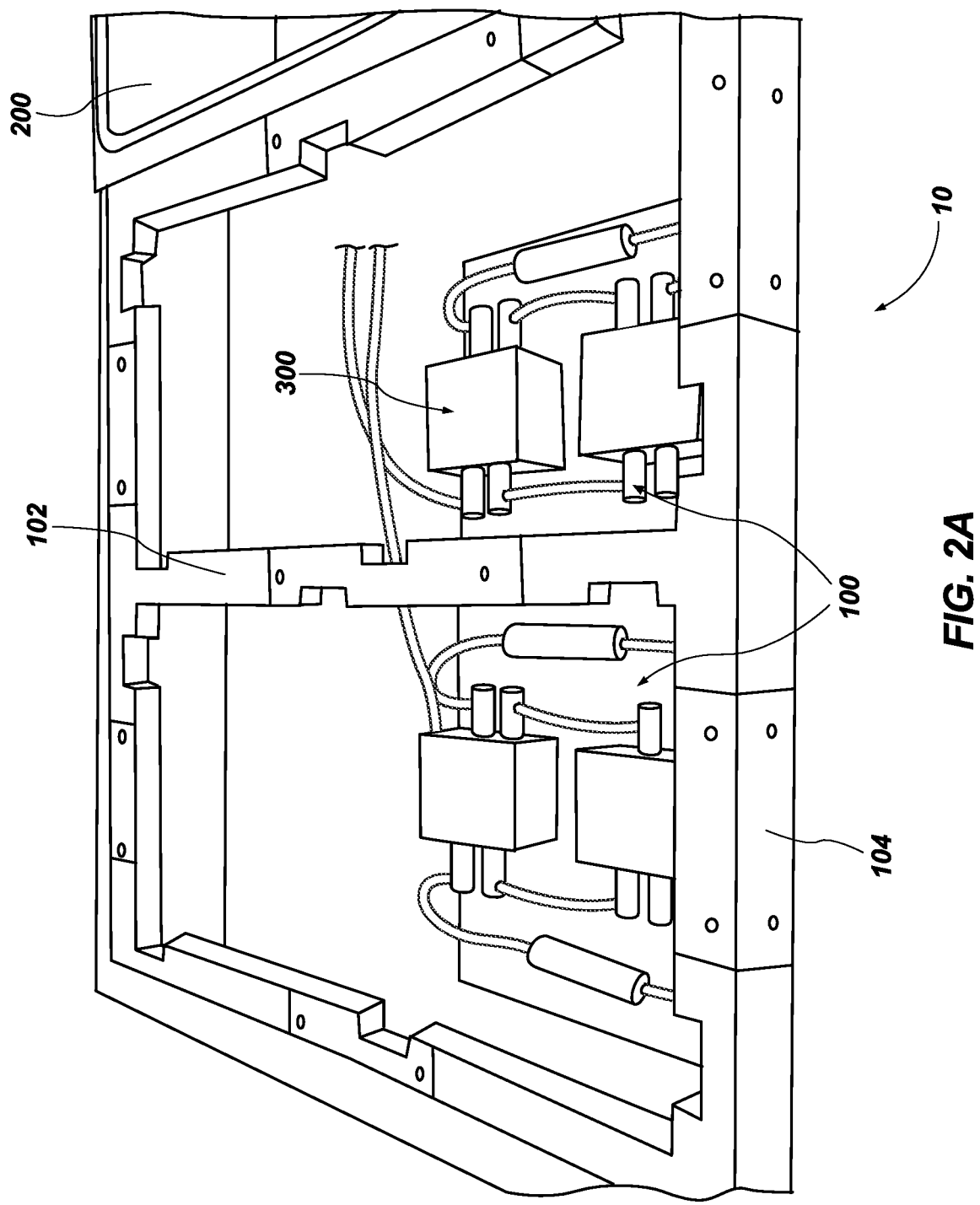
FIGS. 2A and 2B are top perspective views of a portion of the countertop apparatus of FIG. 1 without wells in place depicting components of the heating/cooling system.
Figure 2B:
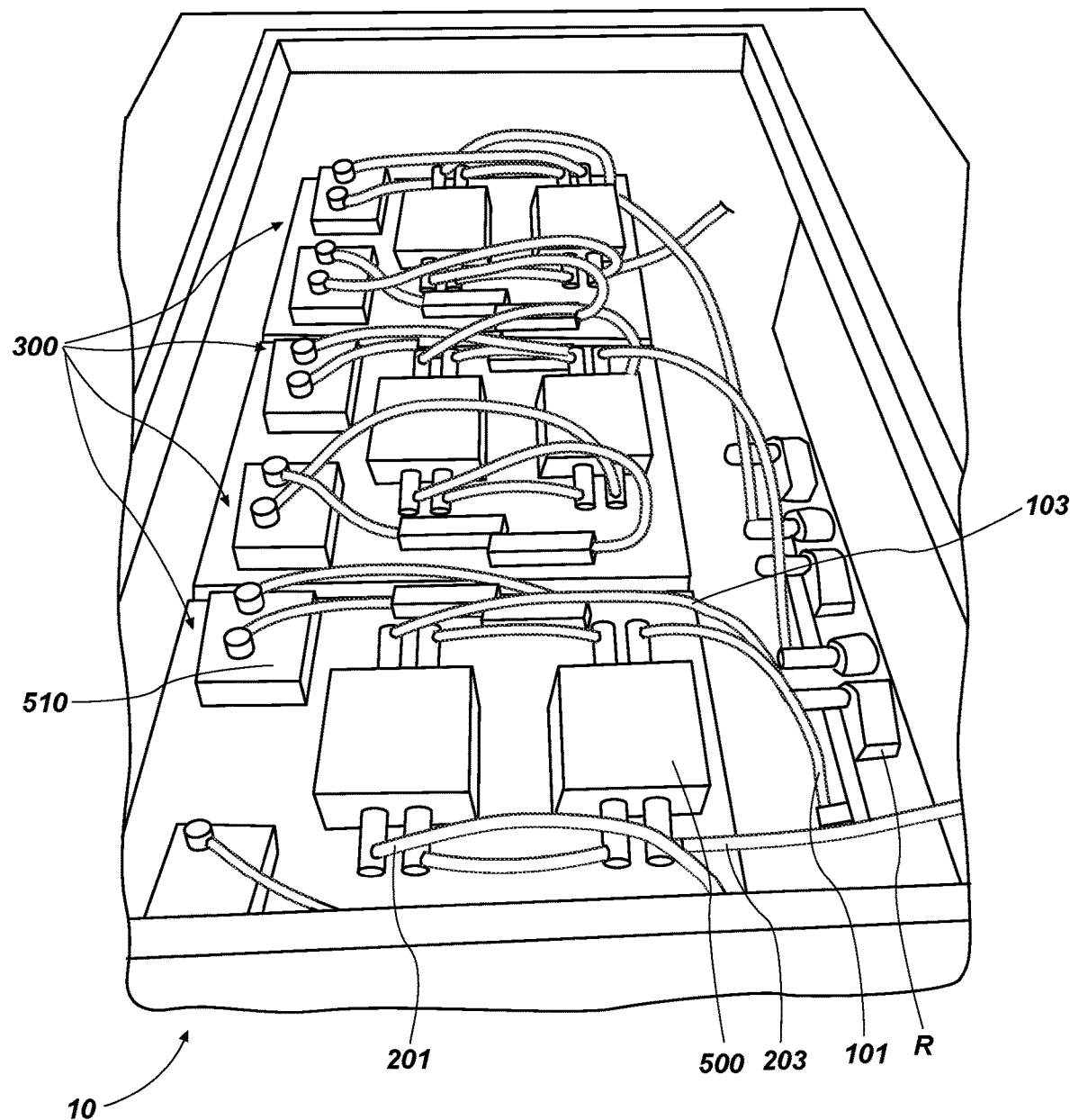

FIGS. 1, 2A, and 2B depict a countertop apparatus 10 for foodservice use which is one illustrative embodiment of an apparatus or system in accordance with the present disclosure.

The countertop apparatus 10 may be a table or "rolling island" which can be moved on casters or may be a cabinet with a countertop installed at a fixed location. In some embodiments, it may be implemented as a standalone device, sized for placement on a preexisting countertop.

At an upper end of the countertop apparatus 10, is an upper surface with one or more wells 100 for holding a tray or pan 200. In the depicted embodiment, the wells 100 are defined by a ridge or lip 104 that surrounds an opening in the upper surface of the apparatus. Several bridge members 102 may be movable to alter the size of the wells, allowing for the accommodation of differently sized pans or trays 200.

Disposed in the apparatus 10 under the wells are the components of the heating/cooling system 300. In the depicted embodiment, these are viewable through the wells 100, but it will be appreciated that in other embodiments, the wells 100 may have sides and floor to protect the system 300 components from inadvertent spills or dropped trays 200. In some such embodiments, the wells may thus either be formed as a series of wells or as one large well with moveable bridge members to allow different configurations. In some smaller embodiments, such as those for use on a preexisting table or countertop, only a single well may be present.

As best depicted in FIG. 2B the apparatus 10 includes a number of components of one or more systems 300 for heating and cooling the trays in the wells 100. It will be appreciated that in the depicted embodiment, four parallel systems 300 are shown. This allows for individual temperature control of trays 200 in the wells 100 of a system using multiple trays. It will be appreciated that the number may vary, and that in some embodiments multiple trays 200 may be controlled by a single system 300.

One or more manifold blocks 500 contain a plurality of Peltier chips. Suitable Peltier chips are disclosed in pending U.S. patent application Ser. No. 14/597,438 filed Jan. 15, 2015 and published as publication number US 2015/0201749, which is incorporated by reference herein in its entirety. Each Peltier chip is a thermoelectric converter element whose effect is based on the Peltier principle in that they are capable of both cooling and heating by virtue of the fact that between their electrodes a temperature differential is created whose directionality is a function of the direction of the current. It will be appreciated that a suitable number of chips may be used, which are sufficient to heat or cool the trays 200 to a suitable temperature and maintain the trays at that temperature. In the depicted embodiment, two blocks 500 are depicted in each system 300, each block 500 containing four chips. It will be appreciated, that a single block 500 holding a differing number of chips may be used or the systems 300 may use different numbers of blocks 500 for differing applications. Currently, a design using eight Peltier chips for each individual well is preferred.

A typical Peltier chip currently in use may be operated at from about 11 to about 15 volts to achieve optimal performance. It will be appreciated that different voltages may be used as the particular chips may vary.

Each manifold block 500 may be formed from two manifolds, which are joined face to face with the 2700 Peltier chips (FIG. 2E) sandwiched therebetween, as discussed in U.S. patent application Ser. No. 14/597,438. FIG. 2F depicts the face to face relationship of a second embodiment of manifolds 2602A and 2602B. The face of each manifold contains a plurality of recesses for receiving a Peltier chip 2700, and each recess contains a flow path, which may be formed as a channel having a Z, S or other shape to direct the flow a heat transfer liquid from one opening to another. A shelf or notch may hold a seal, such as an O-ring, and a may provide a seat for a chip 2700, as best shown in FIG. 2E. The flow paths direct the flow of a heat transfer liquid directly against the surface of the Peltier chips. Each manifold block also contains channels directing the fluid from the flow paths to tubing connected to the manifold. From the first manifold block 500, tubing 101 is attached to the manifold on a first side and flows to a radiator R and the return tube 103 returns the fluid which has transferred its thermal energy using the radiator R back to the manifold block 500 (in the depicted embodiment, the two blocks 500 are connected by a short tube T, and effectively act as a single block), which may be via a reservoir and a pump.

Figure 2C:
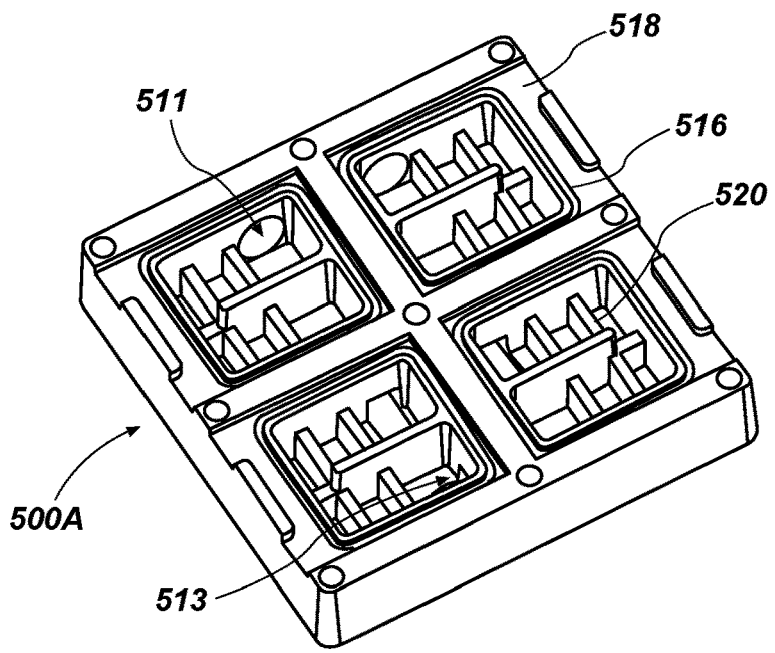
FIGS. 2C and 2D are a top side perspective view and top views of a portion of a manifold block useful in embodiments of the present invention, showing additional details thereof.
Figure 2D:
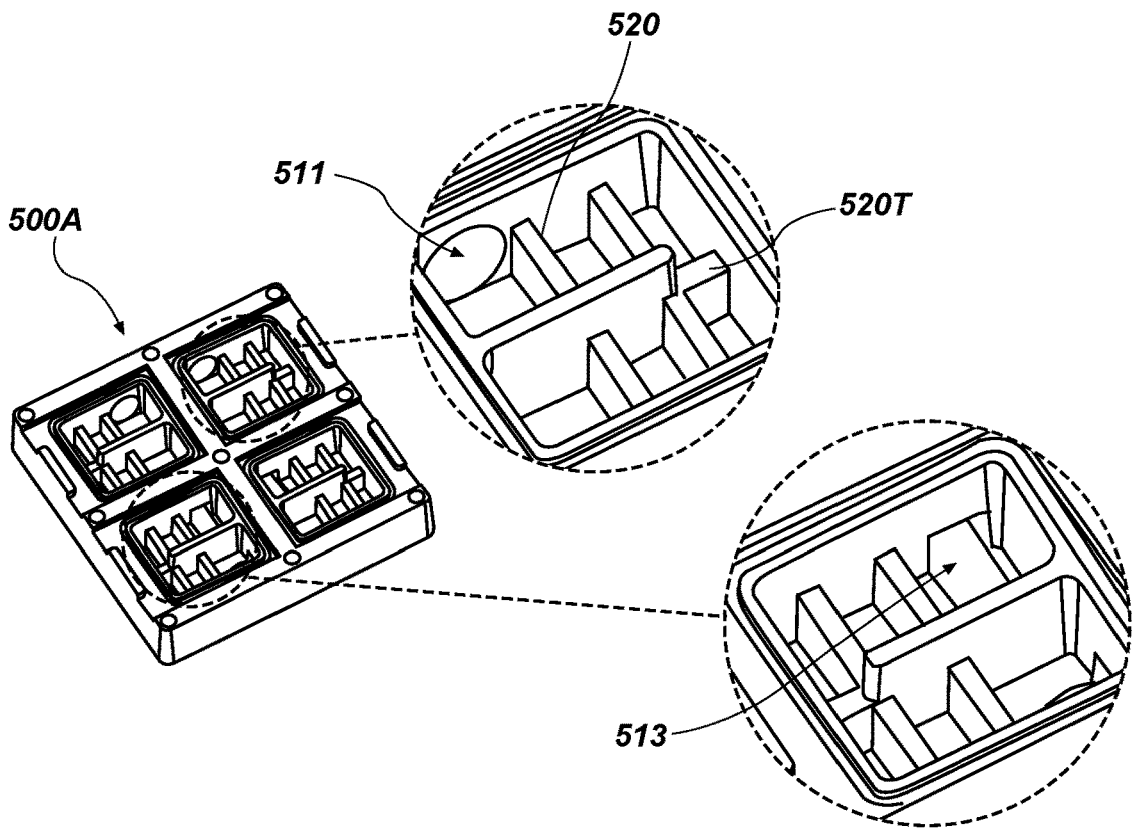
Figure 2E:
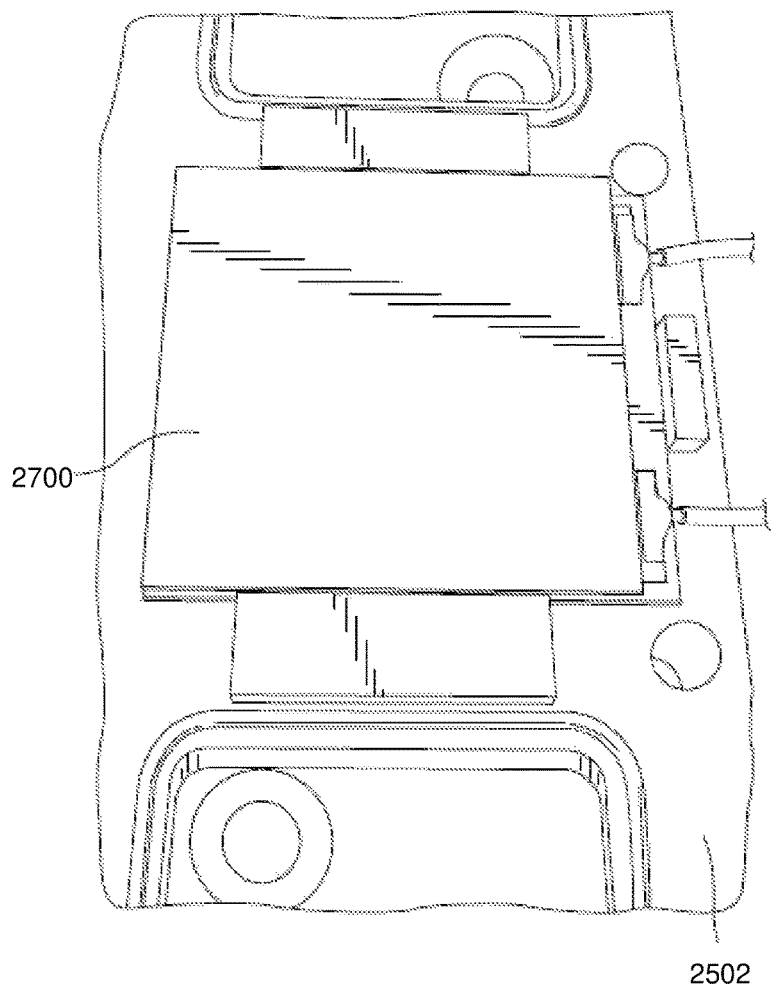
FIG. 2E is a plan view of a Peltier chip in position on a manifold and FIG. 2F is a perspective view of two manifolds showing the relationship used in forming a manifold block in accordance with the principles of the present disclosure.
Figure 2F:
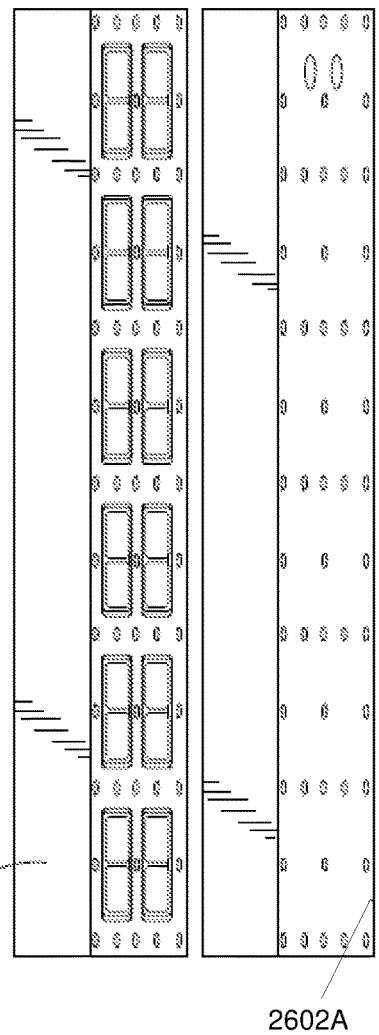

Turning to FIGS. 2C and 2D, the face 503 a manifold 500A is depicted in and contains at least one recess for receiving a chip, each recess contains a flow path 511, which may be formed as a channel having a Z, S, C, U or other shape to direct the flow of a heat transfer liquid from one opening 513 to another. A series of baffles 520 may be placed in the flow path to add turbulence to the flow by directing the fluid passing therethrough upwards against the face of the chip. In the depicted embodiment, the baffles 520 may be formed as upwardly extending walls rising from the floor of the recess upwards for a portion of the depth of the flow path along either side of a generally U-shaped or C-shaped flow channel. The height of the depicted baffles may be from about ⅓ to about ⅔ the depth of the recess. It will be appreciated that while a height of approximately half the depth of the recess is currently used; such height may be varied as suitable for particular installations. Additionally, as depicted, the baffles 520 maybe generally orthogonal to the direction of the fluid flow. In the depicted embodiment, there are five baffles 520 present, with three joined in a generally T-shaped structure 520T disposed at the bottom of the "U" with an additional baffle disposed in each leg of the U. It will be appreciated, that where appropriate, differing numbers and designs for baffles 520 may be used to create the desired turbulent flow and heat transfer.

A recessed notch 516 is present to hold a seal, such as an O-ring, and a recessed seat 518 may be provided for placement of a Peltier chip. It will be appreciated that as depicted, in certain embodiments, multiple recesses with associated notches may be present.

In use, the seal may be an O-ring that it significantly thicker in height than the recessed depth of notch 516. This allows the O-ring to function both as a sealing element and as an adjustment element to account for any variations that may occur between various chips due to manufacturing differences. It also allows the O-ring to function as a cushion, protecting the chip from forces that may otherwise damage it during assembly of the block 500A or during operation.

Returning to FIGS. 2A and 2B, from the second manifold, tubing 201 flows to the tray 200 or trays 200 (as will be discussed in more detail later herein) and the return tube 203 returns the fluid which has transferred its thermal energy to the tray 200 back to the manifold block, which may be via a reservoir 510 and a pump. A transformer and/or power block may be used to supply power to the chips and the pump(s).

Each pump may be any pump with sufficient power to circulate heat transfer fluid through the tubing at a rate sufficient to allow the system to function at an acceptable rate of heating or cooling. Typically, centrifugal-type pumps may be used, although it may be possible to utilize a larger in-line pump.

Each radiator R is typically finned to provide a larger surface area for convection heat exchange to the surrounding air. Since the apparatus 10 is used for heating or cooling food, a non-toxic heat transfer fluid may be used. One such fluid is water, although other acceptable commercially available non-toxic coolants, such as PAHNOL, offered by Houton Chemical, may be used.

The radiator R is positioned where it has access to the environment surrounding the apparatus 10. For example, it may be disposed at a side of the apparatus aligned with a vent. One or more fans may be associated with the radiator 200 to create a desired airflow upon activation. It will be appreciated that in some embodiments, the radiator R may comprise one or more separate radiators positioned at different locations to facilitate rapid heat transfer. For example, where system 10 is formed as a countertop unit, the radiators may be positioned at vents along the base thereof. Where it is a counter unit, similar to that depicted in FIG. 1, the radiators may be disposed along vents at the rear of the unit.

For use, the fans may be directly attached to the radiator(s) R by screws, by a suitable thermal epoxy, by attachment using a mounting bracket, or in any other suitable manner. For example, the fans may be attached to a grillwork, which is then strapped to the radiator.

Electric power for the system may be provided by a battery. Such a battery powered device is extremely portable and may be used in locations where connection to an electrical outlet is undesirable or impossible. Of course, it will be appreciated that a transformer and line connection may be used to provide connection to any standard electrical outlet for power. Currently, it is preferred to operate the components of the apparatus 10 at a voltage of up to about 15V.

Figure 3:
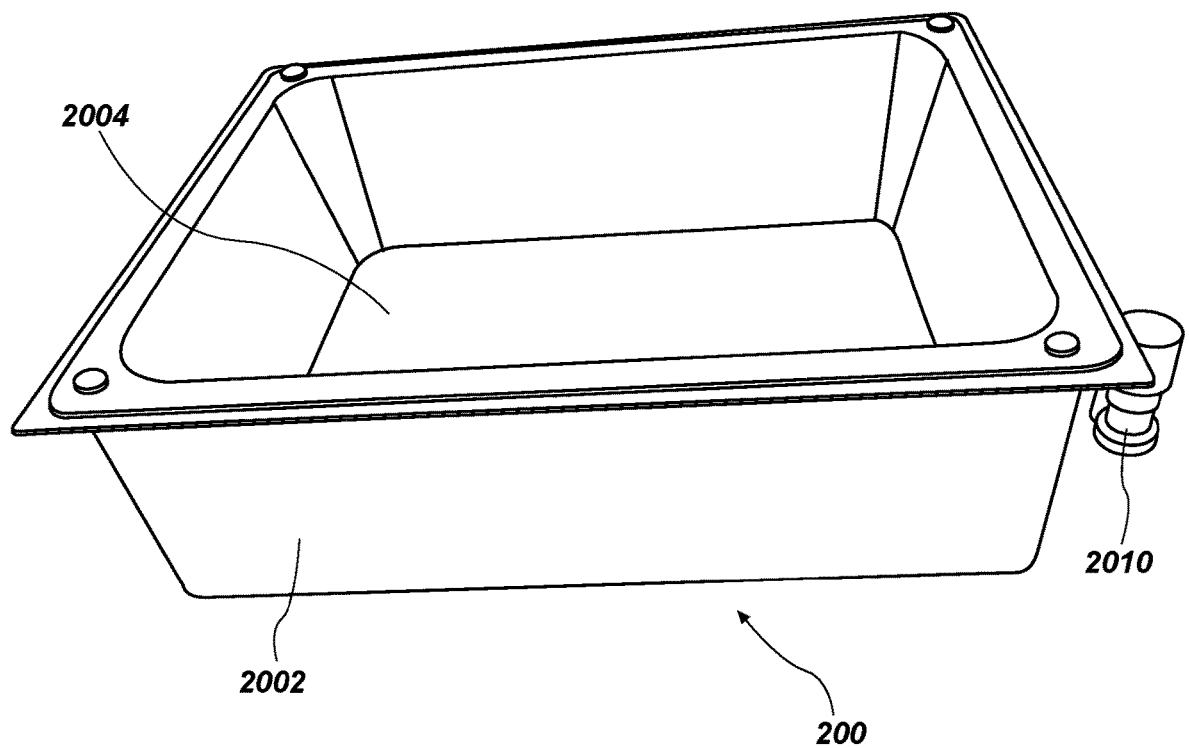
FIG. 3 is a side perspective view of a first well or pan for use with the system of FIGS. 1-2B.

Turning to FIG. 3, a first embodiment of a tray 200 for use with the apparatus 10 is depicted. Tray 200 may be formed in the shape of a traditional tray or pan for a chafing dish, having sidewalls surrounding a generally planar bottom and an upper surface with an overhang allowing for placement in a well 100. The tray 200 may be formed from an inner layer 2004 and an outer layer 2002, each having this general shape. The layers may be attached to one another along a top surface of the tray 200, and define a space therebetween. The defined space is a flow space, and access to the flow space is provided by ports 2010 and 2012 (not shown). Upon installation in the well 100, ports 2010 and 2012 are attached to tubes 201 and 203. Fluid then may flow from manifold block 500 to the flow space and return thereto. As temperature controlled fluid passes through the flow space, the inner surface of the tray 200 is heated or cooled to the desired temperature. The tray 200 thus acts as a "water jacketed" chafing dish. Where useful, a particular flow path may be defined by structures present in the flow space.

Figure 3A:
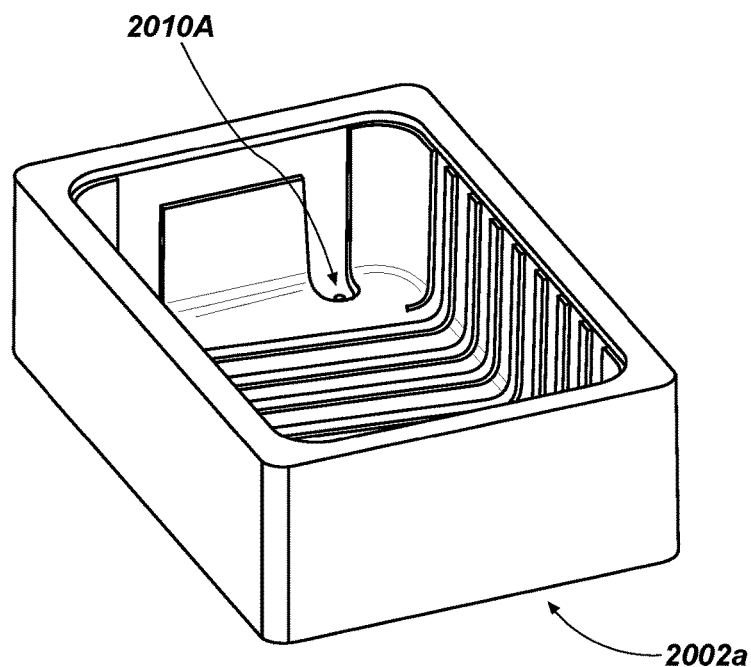
FIGS. 3A and 3B are perspective and top view of an embodiment of a structure for use in the well or pan of FIG. 3.
Figure 3B:
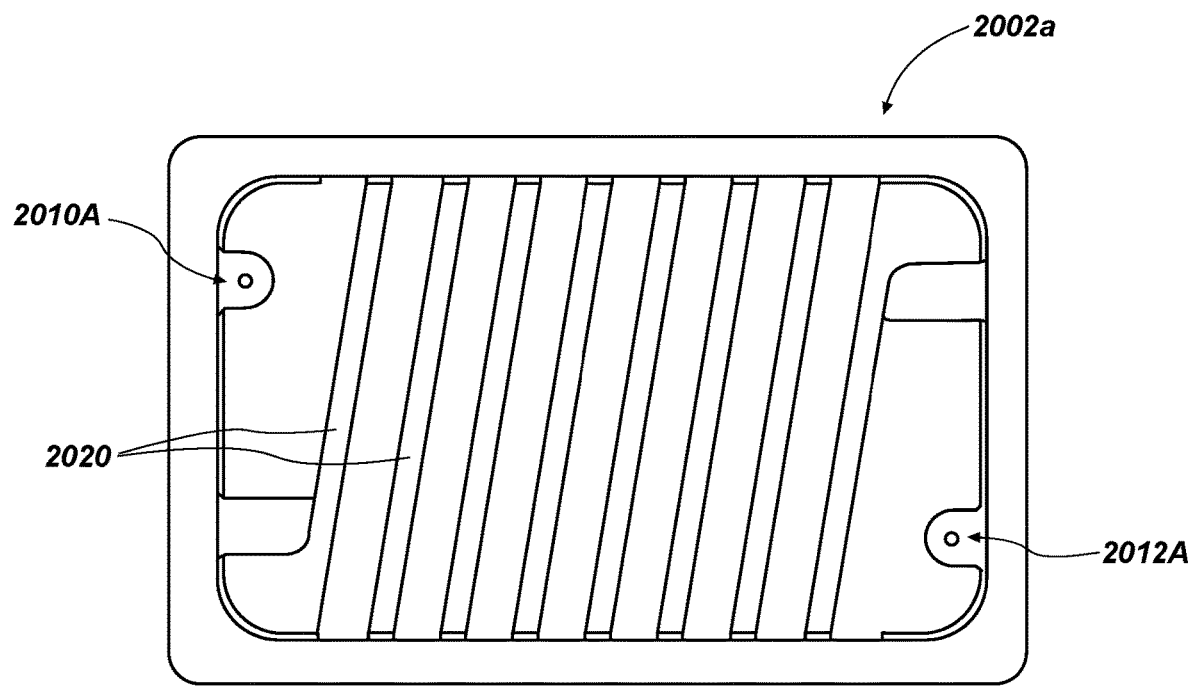

For example, in FIGS. 3A and 3B, a second embodiment of the outer layer 2002A for a tray 200 for use with the apparatus 10. As depicted, the outer layer 2002A may be formed in the shape of a traditional tray or pan for a chafing dish, having sidewalls surrounding a generally planar bottom. An outer wall may define an upper surface for placement of the inner layer 2004. It will be appreciated that the outer layer 2002 may be used as a well itself, with the inner layer 2004 used as a removable pan, or these may be bonded together at an upper surface to form a removable tray, as described with respect to FIG. 3. The layers may be attached (where forming a unitary structure) or disposed (where the inner layer is removable) over another along a top surface of the tray 200, and define a space therebetween. The defined space is a flow space, and access to the flow space is provided by ports 2010A and 2012A. Fluid then may flow from manifold block 500 to the flow space and return thereto. As temperature controlled fluid passes through the flow space, the inner surface of the tray 200 is heated or cooled to the desired temperature. The tray 200 thus acts as a "water jacketed" chafing dish. A flow path defined by the recesses between ridges 2020 directs the flow of fluid around the flow space, around the bottom and sides of the inner layer. As depicted, ridges 2020 may be continuous ridges that extend horizontally across the bottom of the tray 200 and vertically along a majority of the height of two opposite sidewalls.

It will be appreciated that the outer layer 2002A may be formed of a high temperature plastic material by vacuum forming over a blank. In other embodiments, the outer layer 2002A may be formed by injection molding, rotational molding, machining, or as is otherwise know in the art using suitable materials. Where possible, plastic materials that have insulating properties may be used to increase efficiency by insulating the fluid in the flow space from the surrounding external environment.

In some embodiments, the tray 200 may be fixedly mounted in the well and in others it may be removable. In use, water may be placed in the bottom of the tray 200 to serve as a "steam tray" with another pan or tray placed therein, similar to a traditional chafing dish. In others, the tray may be constructed of materials that allow for direct contact with the food, eliminating the need for an internal tray or additional water. For such embodiments, the tray may be constructed to allow for cleaning by placement in a commercial dishwasher. In some embodiments, the ports may work in a "quick connect" mode, allowing for a fast attachment and detachment when trays 200 are exchanged.

In some embodiments where the tray 200 is used as a well, a fan assembly may be placed inside the tray to circulate fluid (such as air) therein during operation under an inserted pan.

It will be appreciated that although depicted as traditional rectangular food service trays herein, that trays 200 and wells of the present system may be formed in other shapes, to appear as platters, serving bowls, and so forth for a desired appearance, as with countertop units or for buffet service.

Figure 4A:
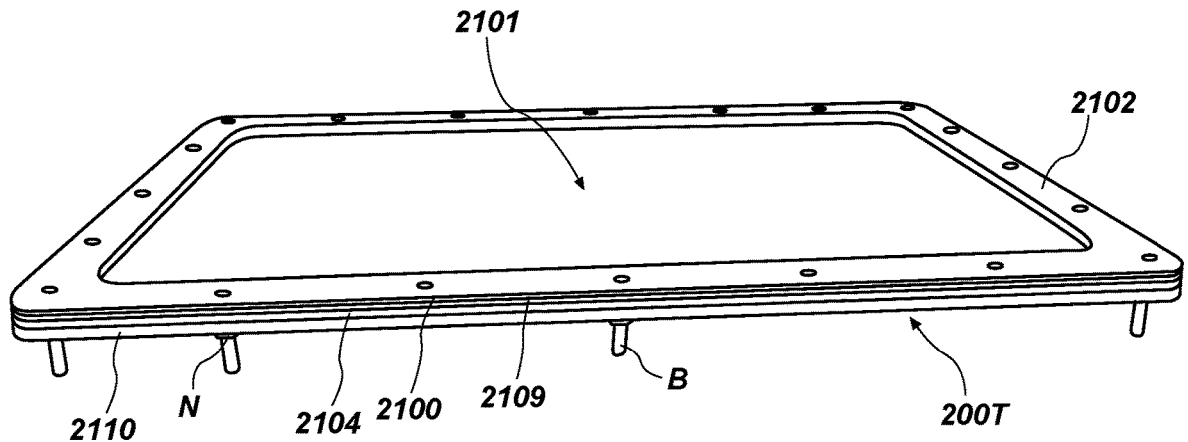
FIGS. 4A and 4B are front perspective and bottom perspective views of an embodiment of a platter style tray or pan for use with the system of FIGS. 1-2B.
Figure 4B:
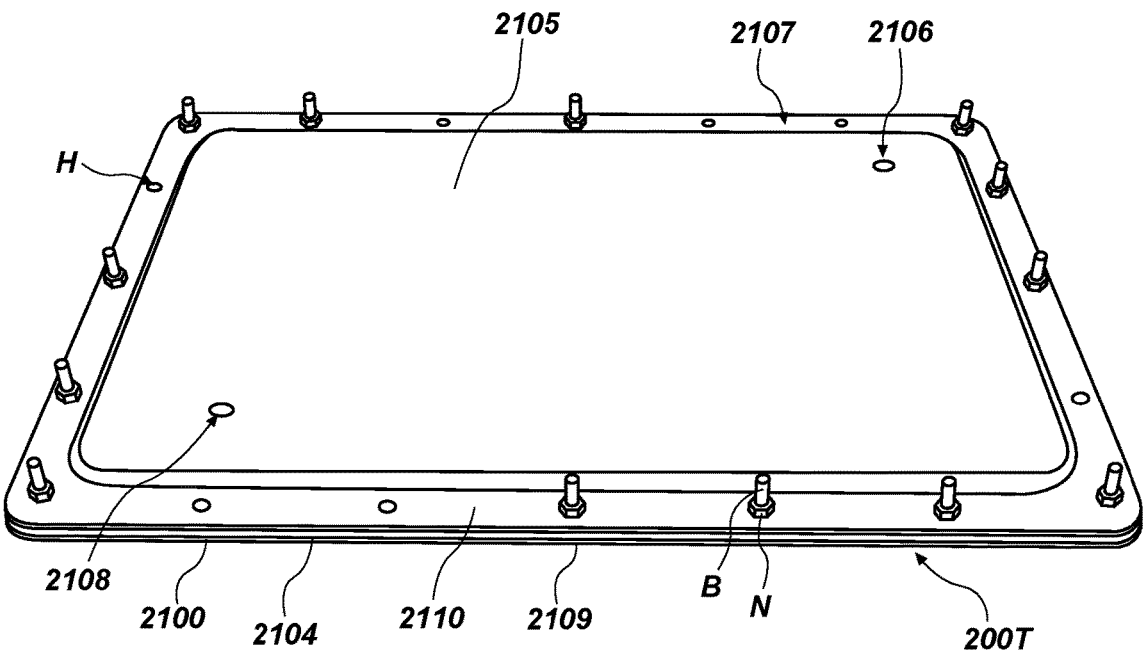

Turning to FIGS. 4A and 4B, a second embodiment of a platter style tray 200T for use with the apparatus 10 is depicted. Tray 200T may be formed in the shape of a platter or a shallow pan having an upper layer 2100 upper surface with a central planar portion 2101 which is surrounded by a rim 2102 that defines an overhang allowing for placement in a well 100 to cover the well. The central planar portion 2101 may be recessed downwards from the rim 2102 as depicted. A lower layer 2104 has a lower surface 2105 with a central planar portion which is surrounded by a rim 2107 that defines an overhang allowing for placement in a well 100 to cover the well. The respective central planar portions are laterally spaced apart to define a flow space therebetween.

The layers may be attached to one another along the respective rims 2102 and 2107 to define the overhanging rim of the tray 200T. A gasket 2109 may be placed between the rims to seal a flow space between the upper and lower layers. A gasket formed of a suitable substance and corresponding to the shape of the rims may be used, as may any other suitable gasket. In the depicted embodiment, the layers are secured by a number of bolts B and corresponding nuts N placed through securing holes H, although it will be appreciated that any suitable fastener may be used.

Access to the flow space is provided by ports 2108 and 2106. Upon installation in the well 100, ports 2108 and 2106 are attached to tubes 201 and 203. Fluid then may flow from manifold block 500 or 500A to the flow space and return thereto. As temperature controlled fluid passes through the flow space, the upper surface of the tray 200T is heated or cooled to the desired temperature. Where useful, a particular flow path may be defined by structures present in the flow space. For example, suitable walls could be formed on the upper or lower layer sides defining the flow space to form flow channels for fluid. Alternatively, a separate structure may be inserted therein, such as a serpentine cut neoprene insert.

In some embodiments, the tray 200T may be fixedly mounted in the well and in others it may be removable. In use, the tray 200T may be used to provide a heated or cooled surface for the presentation of food. For some embodiments, at least the upper layer 2100 of the tray may be constructed of materials that allow for direct contact with the food, eliminating the need for an external trays or pans. For such embodiments, the tray may be constructed to allow for cleaning by placement in a commercial dishwasher. In some embodiments, the ports may include fitting allowing for connection in a "quick connect" mode, allowing for a fast attachment and detachment when trays are exchanged.

Figure 5A:
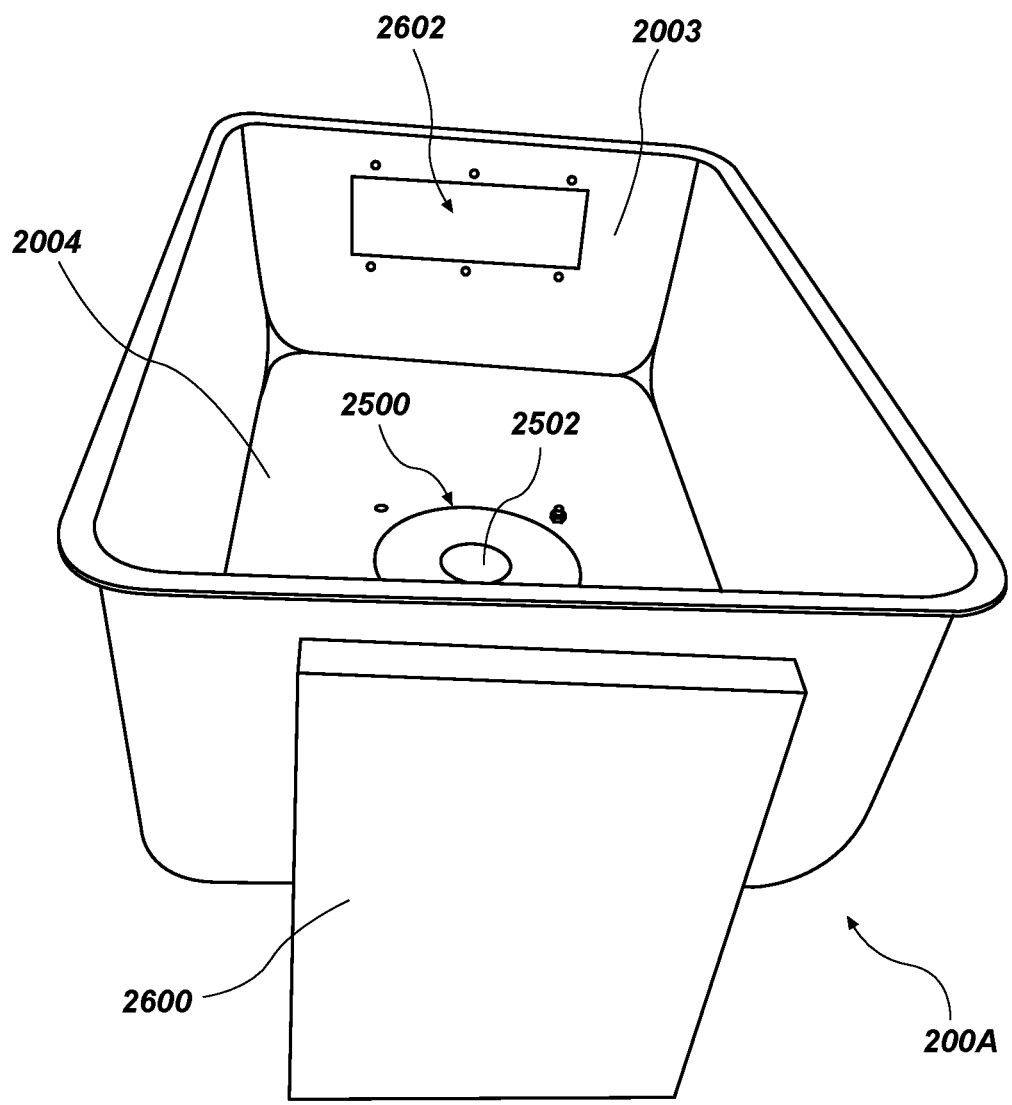
FIGS. 5A, 5B and 5C are front perspective, top and partial side views of a second embodiment of a well or pan for use with the system of FIGS. 1-2B.
Figure 5B:
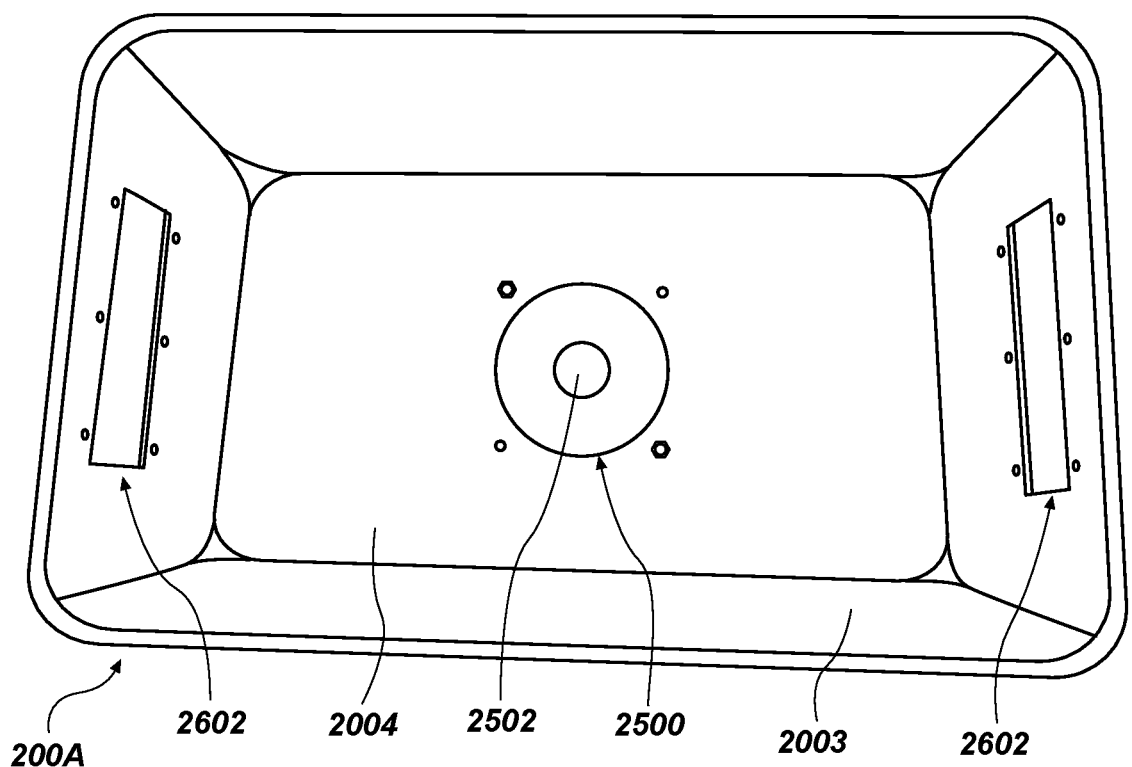
Figure 5C:
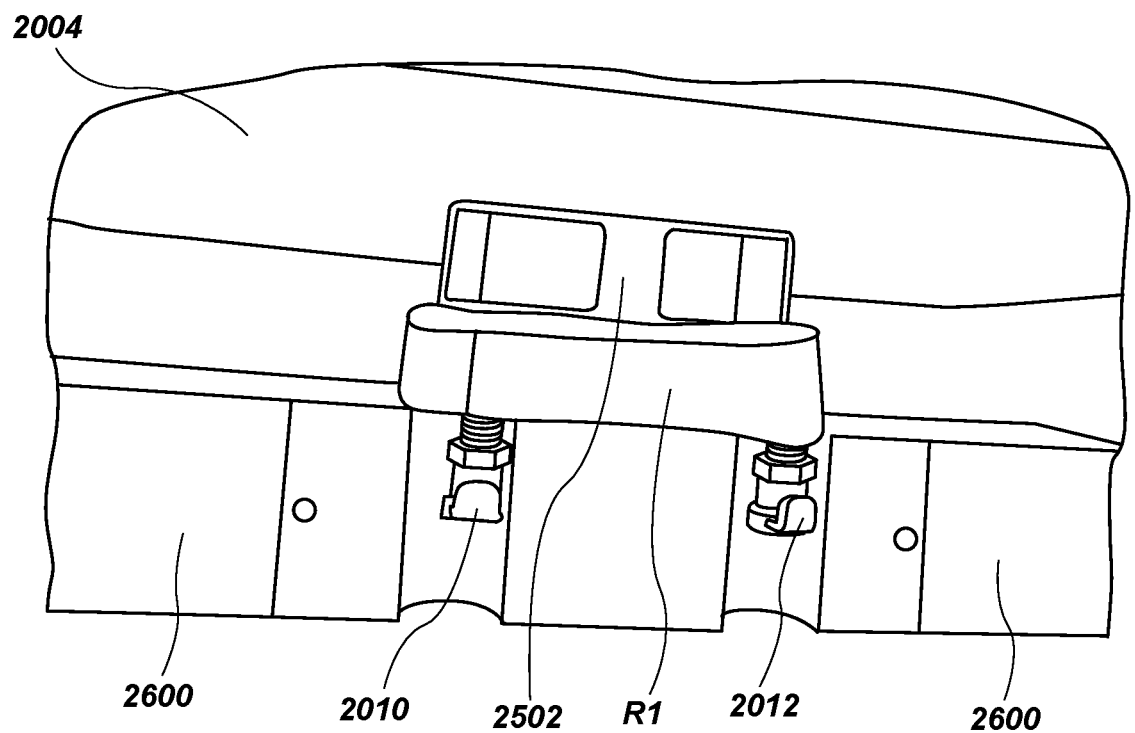

FIGS. 5A through 5C depict another embodiment of a tray 200A. Before turning to the other particular details of the tray 200A, Applicant notes that FIG. 5C depicts ports 2010 and 2012 which are positioned downwards from the bottom of the tray 200A, this may allow for improved functioning in "quick connect" embodiments.

Tray 200A may be formed in the shape of a traditional tray or pan for a chafing dish, having sidewalls 2003 surrounding a generally planar bottom 2004 and an upper surface with an overhang allowing for placement in a well 100.

At a location near the middle of the generally planar bottom a first port 2500 is disposed on the bottom 2004 of the tray 200A. A fan 2502 is positioned at the port 2500. At one or more positions in the upper portion of the sidewalls 2003 a return port 2602 is formed as an opening therethrough. A duct 2600 is connected to the return port 2602 and continues as a passage to a radiator R1 adjacent to fan 2500. While two return ports 2602 and ducts 2600 are depicted, it will be appreciated that other embodiments with differing numbers may be used depending on the size of the tray 200A.

Upon installation in the well 100, ports 2010 and 2012 are attached to tubes 201 and 203, which may be as discussed previously herein. A tray or pan for use with a chafing dish may then be inserted into tray 200A and covers the upper opening thereof. The sidewalls 2003 of the tray 200A are configured to extend downwards at an angle that ensures that space is present between the sidewalls 2003 and the inserted pan.

Fluid then may flow from manifold block 500 to the radiator R1 and return thereto, and fan 2502 activated. This creates flow of air in the tray 200A that flows from port 2500 to the return port(s) 2602 where it passes through the duct(s) 2600 and radiator R1 in a continuing cycle. As it passes through the radiator R1, the cycled air is heated or cooled, causing the temperature within the tray 200A, and by convection, the temperature in the inserted pan to be similarly heated or cooled.

One advantage of the design of the depicted embodiment is that the flow of temperature controlled air passes along the side of the inserted pan to provide cooling and/or heating along that portion of the pan. Previous air flow cooling systems, such as that disclosed in U.S. Pat. No. 5,388,429 issued Feb. 14, 1995 to Shackelford, et al., the contents of which are incorporated herein in their entirety, used cooling fluid circulating in tubing that flowed along a wall in conductive contact with the sidewalls of the pan, then circulated air underneath the pan to attempt to equalize temperature through the pan. This is inefficient and creates a temperature gradient within the inserted pan that can create unacceptable conditions.

A control panel may be included for the system. In a simple embodiment, the control panel may simply consist of a single switch with three settings, OFF, COOL and HEAT. The switch may be a double-pull double-throw switch. Selection of either closed position, (HEAT or COOL) closes the circuit in an opposite direction, reversing the flow of electricity through the Peltier chips and either cooling or heating at the tray associated tray 200, to heat or cool it. At the same time the heat or cold generated on the opposite face of the chips is transferred to the radiator R for dispersal from the system.

In other embodiments, the control may include multiple switches to individually or jointly control either the operational mode of the Peltier elements, or the functioning of the pump or fans. In other embodiments, variable current controls may be used to adjust the temperature within the trays 10 by varying the current through the Peltier elements 700. In other embodiments, a logic control circuit may be used, such as a logic control board on a semiconductor chip. With a logic control circuit, a desired temperature may be selected and the system may cycle on and off as appropriate to maintain the cabinet at or near the selected temperature. It will be appreciated that use for multiple systems 300 in a single apparatus 10 allows for individual temperature control of each well 100, allowing different foods to be maintained at different temperatures. This can allow for cold and hot wells to be next to each other in a single counter, easing the preparation of foods. In some embodiments, it may be possible to choose to direct either side of a system 300 manifold 500 to either a well or pan or to a radiator, to allow a single system 300 to simultaneously heat and cool different wells.

EXPERIMENTAL DATA

A first series of tests were run on an embodiment similar to that depicted in FIGS. 1-3. The system used 8 Laird LHT12-60 Peltier chips which were contained in the manifolds depicted in FIG. 2, which were run at a voltage of about 11.23 DC volts. One external radiator having dimensions of about 20 inches by about 5 inches by about 1 inch and a double walled pan similar to that depicted at 200 having dimensions of about 14.3 inches×about 22.3 inches× about 6.1 inches were used. The heat transfer fluid was Glycol from the pan to the manifold and water from the manifold to the external radiator which was pumped at a variable rate from the manifold. The double wall pan was taken from an ambient temperature to a heated condition or a cold condition and from a cold condition to a heated condition, using the system for heating and cooling. Results showed the system could heat the pan to nearly about 180 degrees and cool it to about 36 degrees and return it to, or maintain it, at either condition as required.

A second series of tests were run on an embodiment similar to that depicted in FIGS. 1-2B, using the "air pan" of FIGS. 5A-5C. The system used 8 Laird LHT12-60 Peltier chips which were contained in the manifolds depicted in FIG. 2, which were run at a voltage of about 11.23 DC volts. One external radiator having dimensions of about 20 inches by about 5 inches by about 1 inch. The pan dimensions were about 14.3 inches×about 22.3 inches×about 6.1 inches and the pan radiator had dimensions of about 20 inches by about 5 inches by about 1 inch. The heat transfer fluid was Glycol from the pan to the manifold and water from the manifold to the external radiator which was pumped at a variable rate from the manifold. The pan was taken from an ambient temperature to a heated condition or a cold condition and from a cold condition to a heated condition, using the system for heating and cooling. Results showed the system could heat the pan to a desired heated serving temperature and cool it to a desired storage or serving temperature return, or maintain, it to either condition as desired.

Additional tests were performed to compare the performance of embodiments depicted herein to currently available products. U.S. Pat. No. 5,388,429 to Shackelford et al, the contents of which are incorporated by reference herein in its entirety, discloses a system for cooling a food service pan that uses refrigerated tubing disposed in a sidewall adjacent the sides of an inserted pan and a fan underneath the pan for air circulation. A commercial embodiment of this type of device, available from Low Temp Industries, Inc. ("LTI") was obtained. Similarly, a "hot well" unit manufactured by LTI which can heat inserted pans was also obtained.

Figure 6A:
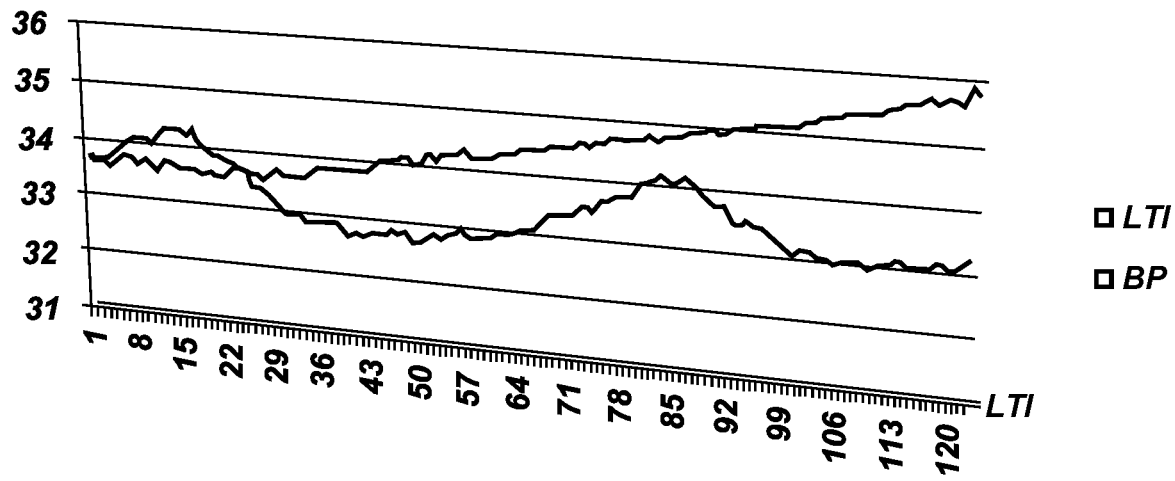
FIGS. 6A, 6B, 6C, and 6D are graphs showing the results of experimental testing performed with the embodiments of FIGS. 1-4C.

A first comparison test, the results of which are depicted in FIG. 6A, was run on an embodiment similar to that depicted in FIGS. 1-3. The system used 8 Laird LHT12-60 Peltier chips which were contained in the manifolds depicted in FIG. 2, which were run at a voltage of about 11.23 DC volts. One external radiator having dimensions of about 20 inches by about 5 inches by about 1 inch and a double walled pan similar to that depicted at 200 having dimensions of about 14.3 inches×about 22.3 inches×about 6.1 inches were used. The heat transfer fluid was Glycol from the pan to the manifold and water from the manifold to the external radiator which was pumped at a variable rate from the manifold. The double wall pan was used as a well with a four inch deep standard steam tray pan placed therein which was filled with mashed potatoes at a starting temperature of about 33.5 degrees F. The system was operated to maintain the food at a cooled temperature of below 40 degrees F. For comparison, a four inch deep standard steam tray pan filled with mashed potatoes at a starting temperature of about 33.5 degrees F. was placed in the well of the LTI system which was similarly operated. As depicted FIG. 6A, both systems maintained the food at a suitable cooled temperature for the two hour period.

Figure 6B:
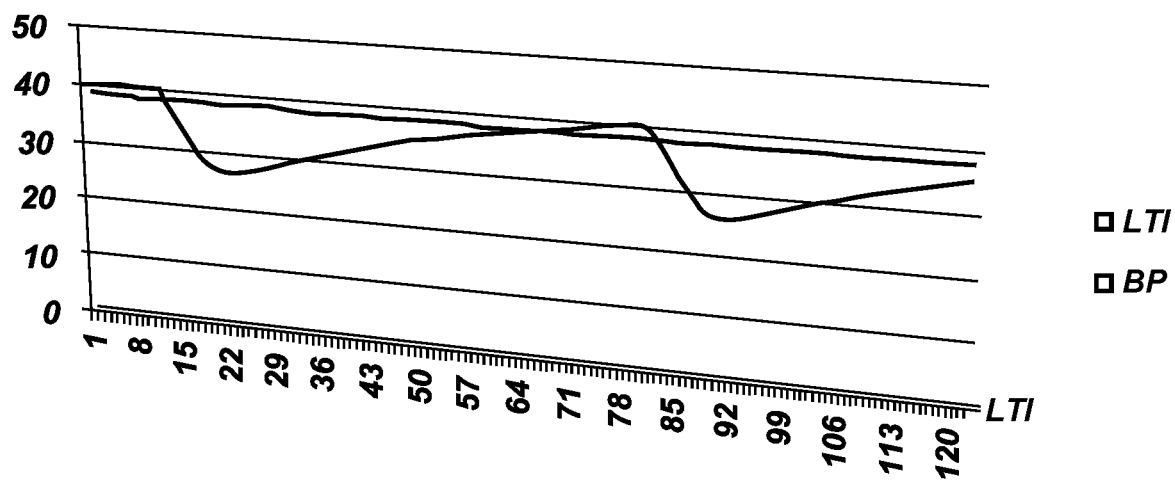

A second comparison test, the results of which are depicted in FIG. 6B, was run on an embodiment similar to that depicted in FIGS. 1-3. The system used 8 Laird LHT12-60 Peltier chips which were contained in the manifolds depicted in FIG. 2, which were run at a voltage of about 11.23 DC volts. One external radiator having dimensions of about 20 inches by about 5 inches by about 1 inch and a double walled pan similar to that depicted at 200 having dimensions of about 14.3 inches×about 22.3 inches×about 6.1 inches were used. The heat transfer fluid was Glycol from the pan to the manifold and water from the manifold to the external radiator which was pumped at a variable rate from the manifold. The double wall pan was used as a well with temperature probes placed on either side of a four inch pan placed therein and the system was operated to maintain at a cooled temperature of below 40 degrees F. For comparison, the LTI system was similarly operated. As depicted in FIG. 6B, both systems were maintained at a suitable cooled temperature for the two hour period. As depicted, the compressor system used by LTI cycled between lower and higher temperatures, while that of the current application did not show a cyclical fluctuation.

Figure 6C:
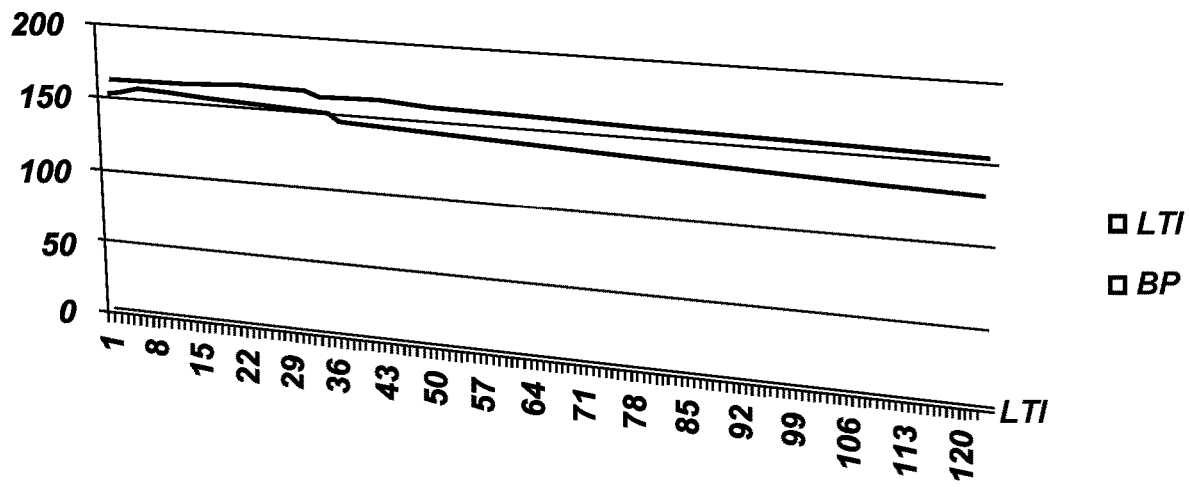

A third comparison test, the results of which are depicted in FIG. 6C, was run on an embodiment similar to that depicted in FIGS. 1-3. The system used 8 Laird LHT12-60 Peltier chips which were contained in the manifolds depicted in FIG. 2, which were run at a voltage of about 11.23 DC volts. One external radiator having dimensions of about 20 inches by about 5 inches by about 1 inch and a double walled pan similar to that depicted at 200 having dimensions of about 14.3 inches×about 22.3 inches×about 6.1 inches were used. The heat transfer fluid was Glycol from the pan to the manifold and water from the manifold to the external radiator which was pumped at a variable rate from the manifold. The double wall pan was used as a well with a four inch deep standard steam tray pan placed therein which was filled with mashed potatoes at starting temperature of about 155 degrees F. The system was operated to maintain the food at a heated serving temperature of above about 150 degrees F. For comparison, a four-inch deep standard steam tray pan filled with mashed potatoes at starting temperature of about 155 degrees F. was placed in the well of an LTI hot well system. As depicted FIG. 6C, the system of the current application maintained the food at a suitable heated temperature for the two hour period, outperforming the LTI system which allowed the food to cool below 150 degrees F.

Figure 6D:
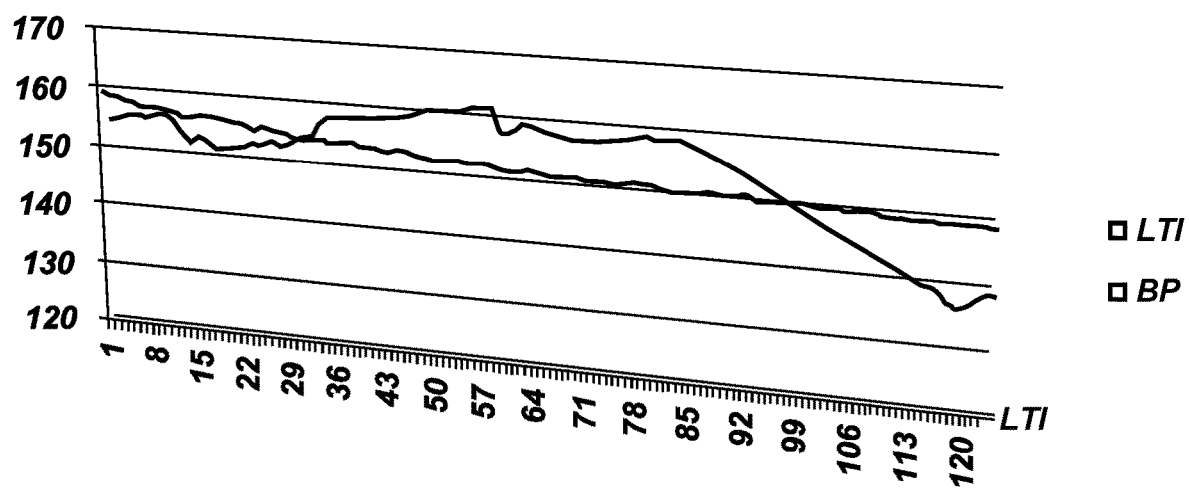

A fourth comparison test, the results of which are depicted in FIG. 6D, was run on an embodiment similar to that depicted in FIGS. 1-3. The system used 8 Laird LHT12-60 Peltier chips which were contained in the manifolds depicted in FIG. 2, which were run at a voltage of about 11.23 DC volts. One external radiator having dimensions of about 20 inches by about 5 inches by about 1 inch and a double walled pan similar to that depicted at 200 having dimensions of about 14.3 inches×about 22.3 inches×about 6.1 inches were used. The heat transfer fluid was Glycol from the pan to the manifold and water from the manifold to the external radiator which was pumped at a variable rate from the manifold. The double wall pan was used as a well with a four inch pan inserted therein and temperature probes placed on either side thereof and the system was operated to maintain at a heated temperature. For comparison, the LTI hot well system was similarly operated. As depicted in FIG. 6D, both systems were maintained at a suitable heated temperature for over 1.5 hours.

While this invention has been described in certain embodiments, the present invention can be further modified within the spirit and scope of this disclosure. This application is therefore intended to cover any variations, uses, or adaptations of the invention using its general principles. Further, this application is intended to cover such departures from the present disclosure as come within known or customary practices in the art to which this invention pertains.

The invention claimed is:

1. A system for heating and cooling food, the system comprising:
a plurality of double walled trays, each double walled tray having sidewalls surrounding a generally planar bottom, and defining a flow space for a heat transfer fluid between the double walls, the flow space including a flow path defined by continuous ridges that extend horizontally across the bottom of the at least one tray and vertically along a majority of the height of two opposite sidewalls to define channels that direct the flow of the heat transfer fluid around the flow space horizontally across the bottom of the double walled tray and vertically along the sidewalls of the double walled tray;
a plurality of temperature adjustment systems corresponding to the plurality of double walled trays, each temperature adjustment system comprising:
at least a first manifold block comprising a first manifold and a second opposite manifold,
the first manifold having a plurality of openings, with a seat formed around each opening, the seat having a groove formed therein that surrounds the opening, and an O-ring having a thickness greater than a depth of the groove, the O-ring at least partially residing in the groove with a portion of the O-ring extending out from the groove to seal against a first surface of at least a first Peltier chip, and a first flow path for the heat transfer fluid, the flow path being partially defined by the first surface of the at least first Peltier chip, the first manifold in operative connection to the double walled tray such that temperature adjusted heat transfer fluid circulates from the first manifold to the flow space of the double walled tray and returns from the double walled tray to the first manifold in a first loop,
the second opposite manifold attached to the first manifold, the second opposite manifold having a plurality of openings corresponding to the first manifold's plurality of openings, each allowing a seal to be made against a second surface of the at least first Peltier chip to define a second flow path for the heat transfer fluid, the flow path being partially defined by the second surface of the at least first Peltier chip, the second opposite manifold in operative connection to a radiator such that the heat transfer fluid circulates from the second opposite manifold to the radiator in a second loop, and
at least one pump for circulating the heat transfer fluid, such that application of electrical current in a first direction to the at least first Peltier chip heats the fluid in the first loop to increase the temperature in the corresponding double walled tray and application of electrical current in a second direction to the at least first Peltier chip cools the fluid in the first loop to decrease the temperature in the corresponding double walled tray; and
each double walled tray may be independently heated or cooled.

2. The system of claim 1, wherein each opening defining the first flow path comprises a channel which includes one or more baffles having a height of from about ⅓ to about ⅔ the depth of the opening for creating turbulent flow to increase the contact of the heat transfer fluid with the first surface of the at least first Peltier chip.

3. The system of claim 2, wherein the one or more baffles comprises walls disposed in the channel that are generally orthogonal to the direction of flow and extend upwards from a floor of the channel to a position below the top of the channel.

4. The system of claim 1, wherein the temperature of each double walled tray in the system is separately controllable, such that the system may have heated trays and cooled trays operating simultaneously.

5. The system of claim 1, wherein each double walled tray is an interchangeable tray that may be removed and replaced.

6. The system of claim 1, wherein at least one tray of the plurality of trays is formed in the shape of a traditional tray for a chafing dish.

7. The system of claim 1, further comprising at least one fan for encouraging airflow through the radiator.

8. A system for heating and cooling food, the system comprising:
a support structure including at least one tray receiving well;
at least a first temperature adjustment system corresponding to the at least one well, the at least first temperature adjustment system comprising:
a first manifold having a plurality of openings, with a seat formed around each opening to seal against a first surface of a Peltier chip, the first manifold and the first surface of the Peltier chip partially defining a first flow path for a heat transfer fluid which directly contacts the first surface of the Peltier chip, the flow path comprising a channel which includes one or more baffles having a height of from about ⅓ to about ⅔ the depth of the opening for creating turbulent flow to increase the contact of the heat transfer fluid with the first surface of the Peltier chip, and the first manifold in operative connection to tubing accessible in the at least one well such that temperature adjusted fluid circulates from the at least manifold to the at least one well to the tray received therein and returns from the at least one well to the first manifold in a first loop,
a second opposite manifold attached to the first manifold to form an at least a first manifold block, the second opposite manifold having a corresponding plurality of openings, each allowing a seal to be made against a second surface of the Peltier chip to define a second flow path for a heat transfer fluid which directly contacts the second surface of the Peltier chip, the second opposite manifold in operative connection to a radiator such that the heat transfer fluid circulates from the second opposite manifold to the radiator in a second loop, and
at least one pump for circulating the heat transfer fluid, such that application of electrical current in a first direction to the plurality of Peltier chips heats the fluid in the first loop to increase the temperature in the first loop and application of electrical current in a second direction to the plurality of Peltier chips cools the fluid in the first loop to decrease the temperature in the first loop; and
a double walled tray disposed in the at least one tray receiving well and in operative connection with the temperature adjustment system by attachment of at least a first inflow port and at least a first outflow port to the tubing in communication with the at least first manifold, the double walled tray having sidewalls surrounding a generally planar bottom, and including a flow path defined by continuous ridges disposed between the double walls that define channels that direct the flow of the heat transfer fluid around the flow space horizontally across the bottom of the double walled tray and vertically along the sidewalls of the double walled tray, wherein the continuous ridges extend horizontally across the bottom of the double walled tray and vertically along a majority of the height of two opposite sidewalls of the double walled tray.

9. The system of claim 8, wherein the one or more baffles more precisely each have a height of about ½ the depth of the opening.

10. The system of claim 8, wherein the one or more baffles comprises walls disposed in the channel that are generally orthogonal to the direction of flow and extend upwards from a floor of the channel to a position below the top of the channel.

11. The system of claim 8, wherein the double walled tray is an interchangeable tray that may be removed and replaced.

12. the system of claim 8, wherein the double walled tray is formed in the shape of a traditional tray for a chafing dish.

13. the system of claim 8, wherein the at least one tray includes structures in the flow space to direct fluid flow around the flow path of the at least one tray from the at least first inflow port to the at least first outflow port.

14. The system of claim 8, wherein the tray is formed in the shape of a traditional tray for a chafing dish, having sidewalls surrounding a generally planar bottom, and includes a tray radiator disposed underneath the tray to which the at least first inflow port and the at least first outflow port connects, ductwork defining a path for movement of temperature controlled air passing through the tray radiator into the tray and a fan for moving temperature adjusted air through the tray radiator and into the ductwork.

15. The system of claim 8, wherein the seat formed around each opening has a groove formed therein that surrounds the opening, and an O-ring having a thickness greater than the groove, the O-ring at least partially residing in the groove with a portion of the O-ring extending out from the groove.

16. The system of claim 2, wherein the one or more baffles each have a height of about ½ the depth of the opening.

* * * * *